US012793323B2

(12) United States Patent
Cheney et al.

(10) Patent No.: US 12,793,323 B2
(45) Date of Patent: Nov. 10, 2026

(54) SYSTEM AND METHOD FOR REALTIME SENSOR VISUALIZATION IN DEGRADED VISUAL ENVIRONMENTS

(71) Applicant: Battelle Memorial Institute, Columbus, OH (US)

(72) Inventors: Philip P. Cheney, Bexley, OH (US); Noah Limes, Columbus, OH (US); Noah Ludwig, Columbus, OH (US); David Hall, Columbus, OH (US); Anthony Polinori, Columbus, OH (US); Wesley C. Pirkle, New Albany, OH (US)

(73) Assignee: Battelle Memorial Institute, Columbus, OH (US)

( * ) Notice: Subject to any disclaimer, the term of this patent is extended or adjusted under 35 U.S.C. 154(b) by 117 days.

(21) Appl. No.: 18/897,508

(22) Filed: Sep. 26, 2024

(65) Prior Publication Data

US 2025/0111590 A1 Apr. 3, 2025

Related U.S. Application Data

(60) Provisional application No. 63/586,467, filed on Sep. 29, 2023.

(51) Int. Cl.

| | |
|---|---|
| ***G06T 15/06*** | (2011.01) |
| ***G01S 17/89*** | (2020.01) |
| ***G06T 5/20*** | (2006.01) |
| ***G06T 5/70*** | (2024.01) |

(52) U.S. Cl.

CPC .............. *G06T 15/06* (2013.01); *G01S 17/89* (2013.01); *G06T 5/20* (2013.01); *G06T 5/70* (2024.01)

(58) Field of Classification Search

None

See application file for complete search history.

(56) References Cited

U.S. PATENT DOCUMENTS

| | | | | |
|---|---|---|---|---|
| 2007/0171094 | A1 | 7/2007 | Alter et al. | |
| 2008/0074312 | A1 | 3/2008 | Cross et al. | |
| 2009/0167595 | A1 | 7/2009 | Cross et al. | |
| 2009/0185741 | A1 | 7/2009 | Nahari et al. | |
| 2019/0355266 | A1 | 11/2019 | Cross et al. | |
| 2023/0131160 | A1* | 4/2023 | Davalos | G08G 5/53 342/26 B |
| 2024/0201391 | A1* | 6/2024 | Zhang | G01S 7/4815 |
| 2025/0381952 | A1* | 12/2025 | Klaus | B60W 30/09 |
| 2026/0073702 | A1* | 3/2026 | Shi | G06V 10/764 |

OTHER PUBLICATIONS

International Search Report and Written Opinion from corresponding PCT Appln. No. PCT/US2024/048586, dated Dec. 12, 2024. 10 pages.

* cited by examiner

*Primary Examiner* — Parul H Gupta

(74) *Attorney, Agent, or Firm* — Secant IP, PLLC; Donald G. Weiss

(57) ABSTRACT

In an approach to real-time sensor visualization in a presence of scattering particles, a system includes a vehicle, the vehicle comprising: one or more computing devices, Light Detection and Ranging (LiDAR) circuitry; and one or more vehicle sensors. The system is configured to: emit pulsed light waves from the LiDAR circuitry; receive return data from the LiDAR circuitry; receive sensor data from the one or more vehicle sensors; filter the return data and the sensor data to visualize a plurality of terrain points without obscuring points; and create a software rendered presentation of a surroundings.

18 Claims, 12 Drawing Sheets

SYSTEM AND METHOD FOR REALTIME SENSOR VISUALIZATION IN DEGRADED VISUAL ENVIRONMENTS

CROSS-REFERENCE TO RELATED APPLICATIONS

The present application claims the benefit of the filing date of U.S. Provisional Application Ser. No. 63/586,467, filed Sep. 29, 2023, the entire teachings of which application is hereby incorporated herein by reference.

TECHNICAL FIELD

The present application relates generally to three-dimensional (3D) imaging and, more particularly, to a system and method for real-time sensor visualization in degraded visual environments.

BACKGROUND

Visibility and navigation are impossible in the overwhelming presence of scattering particles, such as in white-out snow conditions, sandstorms, or even heavy fog. This brings travel and operations to a halt and affects scientific expeditions, search and rescue operations, military operations, and others.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
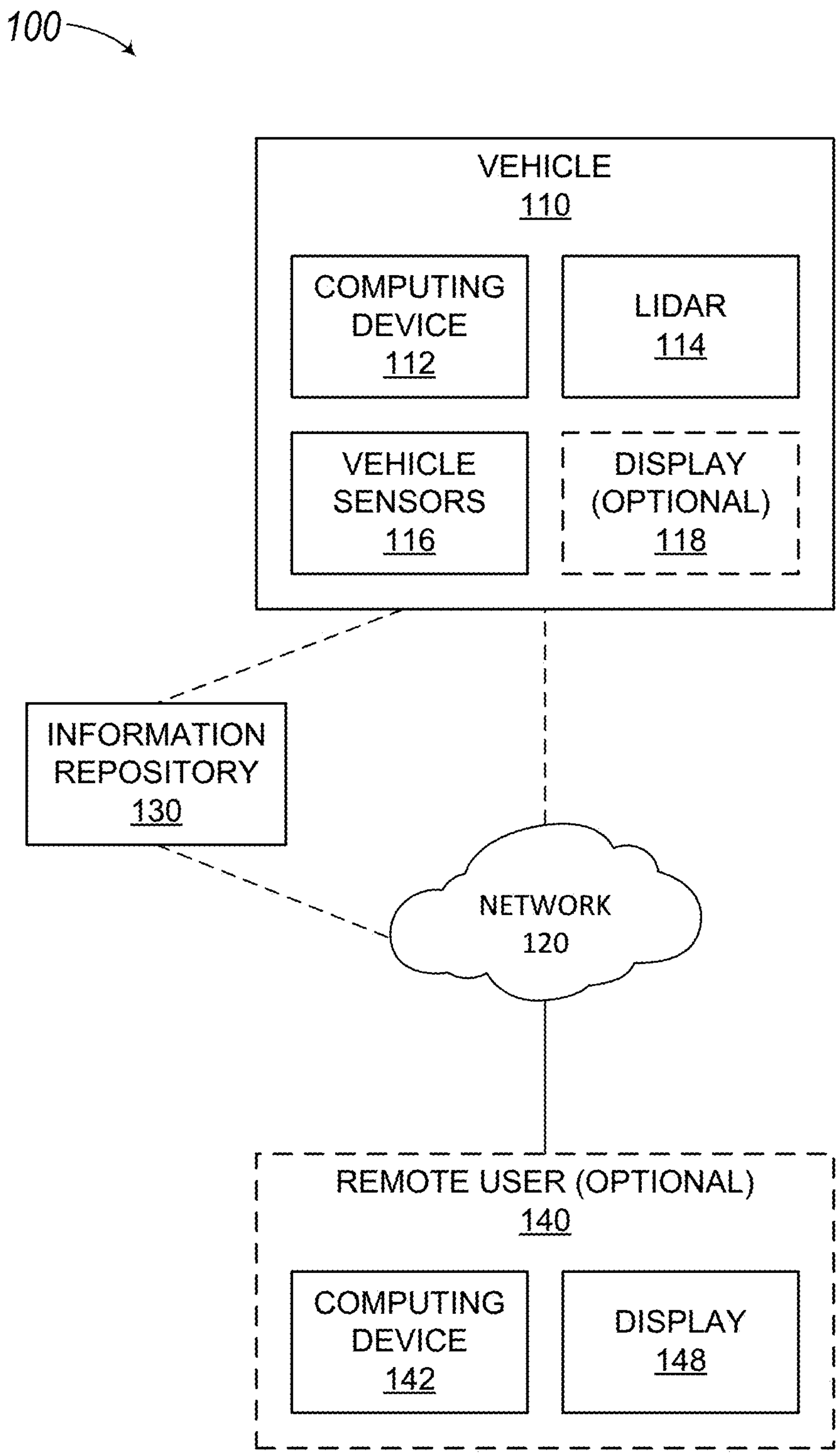
FIG. 1 is a functional block diagram illustrating one example of a system for real-time sensor visualization in degraded visual environments consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Visibility and navigation may be impossible in the overwhelming presence of scattering particles, such as in white-out snow conditions, sandstorms, or even heavy fog. This brings travel and operations to a halt and affects scientific expeditions, search and rescue operations, military operations, etc. Few solutions exist for this problem, and the solutions that do exist tend to rely on old data and are unintuitive to use. There is also a need to operate robotic vehicles on unmapped terrain through variable environmental conditions. Current autonomy solutions fail in these difficult conditions, so the vehicles are often teleoperated by trained personnel. However, teleoperation using compressed 2D video in degraded conditions is difficult and can result in mission failure.

Utilizing Light Detection and Ranging (LiDAR), radar, structured illumination imaging, and other point cloud generating sensors in the presence of airborne obscurants, such as snow, rain, or dust, can pollute the captured point cloud dataset (a discrete set of data points in space that represent a 3D shape or object) and disrupt the interpretation of sensed data. This is especially important as the density of obscurants increase and the number of real (non-obscurant) ranging signal returns decreases.

There exists a need for a user to gain situational awareness in these circumstances, i.e., for systems and methods for clear synthetic vision for driver assistance technologies and terrain generation for autonomous vehicles. The system and method disclosed herein allow for less-limited visibility and resumed navigation in these circumstances.

The disclosed system and method allow for the user to regain situational awareness in these circumstances. Conceptually, the chances of a photon passing through a dense scattering medium without encountering any scattering particles is extremely low, but not zero. Given enough attempts, some photons will pass through the scattering medium and reflect a return signal to the source. This is especially true if the particles in the media are randomly moving like in snowfall. The disclosed system and method use a large number of attempts, combined with identification of successful attempts, to make a scene determination even in these challenging conditions.

In an embodiment, data analysis and point cloud processing may be applied to the return signals from LiDAR circuitry operating in the overwhelming presence of scattering particles (e.g., snow, dust, rain) to obtain an accurate and useful representation of the scene behind the scattering particles. This may be achieved by looking for lucky LiDAR returns that have managed to pass through the cloud of particles without being scattered even once. This is a very low probability event, but the low probability may be overcome by increasing the number of attempts at imaging through the cloud and filtering out the unsuccessful attempts.

In an embodiment, the disclosed system may be configured to operate by mining and processing LiDAR return data in search of lucky returns. The system detects non-random return locations in the point cloud. For example, if multiple returns are received from the same point in the point cloud, then the point is likely a fixed point, i.e., part of the terrain. If multiple returns are not received from the same point in the point cloud, then the return is likely from a particle, such as snow or dust. These may be fixed if the operator is fixed, moving, or moving in a smooth manner consistent with the movement of the operator. The disclosed system looks for Doppler shifts or unexpected rotational shifts in the return signals. The disclosed system may take steps to allow for more lucky returns, for example, tuning the LiDAR for lower scattering and absorption in the specific particulate cloud encountered, and decreasing the beam diameter (decreasing beam divergence) to allow the lucky window to be smaller.

In an embodiment, the disclosed system and method may filter a stream of geolocation tagged points to remove all points that are not consistent with the terrain surrounding a fixed or moving sensor platform. The terrain reference frame can be determined by the general flow of the majority of points, or a special subset of points (e.g., points that should be the ground), or orthogonal sensors (e.g., Global Positioning System (GPS) or Inertial Measurement Unit (IMU)), or by a combination of these. Non-terrain points can be determined by inconsistency with the terrain reference frame, or by temporal discontinuity, or by spatial distribution uncharacteristic of terrain points.

In an embodiment, the non-terrain points may include return data from a person or persons in the environment. In some embodiments, the return data may be filtered out to remove the person or persons from the scene. In some other embodiments, for example in a search and rescue operation, the return data may be used to locate a person or persons in need of rescue.

In an embodiment, the system may filter the return data using temporal and spatial filtering of streaming return data, and may establish a terrain reference frame, either from flow of the data or from orthogonal sensors, to aid filtering of obscurant-associated data. The system applies this filtering, in near-real time, to LiDAR data, radar data, and other sensor data to visualize the terrain points clearly without obscuring points. This concept allows the filtering of snow, dust, rain, or other obscurants from sensor-derived point cloud data. This enables clear synthetic vision for driver assistance technologies or terrain generation for autonomous vehicles.

Depending on the sensor suite that is used to build the surrogate world, this could allow for useful awareness in many other situations, such as complete darkness. Even in the event of damage to outside sensor systems, awareness of the world as it was before the sensor was damaged would persist, allowing a user to continue to navigate terrain instead of being blind to their position in the outside world (e.g., for drivers of tanks and heavily armored vehicles, for operators of undersea or space probes, for teleoperators in general).

In an embodiment, the disclosed system may present to a user a software rendered presentation of their surroundings, as built up from accumulated sensor measurements, fusion of those measurements, and filtering and processing of those measurements. This presentation can be optimized for recognition of dangers or objects/terrain of interest and may be continually updated as new sensor data arrives. Presentation to the user can happen through fixed displays (such as a dash mounted screen), portable displays (such as a tablet computer or phone), immersive headsets (such as a virtual reality headset), or see-through headsets (such as an augmented reality headset). The pose of the viewport in the presentation may be presented from the point of view of the user, as determined by sensors in the user's display device (e.g., inertial measurement units, camera-based tracking, gyro/accelerometers). It should be noted that while this disclosure is written around the concept of a vehicle-based system, embodiments of this disclosure may be applied to a human mounted system, human operation in a fixed environment with a rich set of environmentally mounted sensors, or any other environment where real-time sensor visualization may be required.

In an embodiment, the disclosed system may use modern sensors to build and continually update a simulation of the real world to track the user's position and pose within the real world, and to place the user's position and pose in the corresponding position in the simulation.

In an embodiment, the disclosed system may be the core for a variety of applications, including, but not limited to, whiteout/dust/fog navigation, discreet operations, e.g., in night-time, teleoperation of remotely controlled vehicles, and continued operations after sensor damage/blindness.

In an embodiment, the disclosed system may be a computer representation of the real world that a user is immersed in or otherwise has visibility into through a viewport that is synchronized to the real world through a position/pose tracking system. This aspect may give the user visibility of terrain and objects around them even if they otherwise cannot see them because of weather conditions, a lack of windows, heavy armor, absence of illumination, etc. The world can be built up from a variety of inputs such as topographical maps (synthetic aperture radar (SAR)/LiDAR), satellite imagery, GPS breadcrumbs, live LiDAR imagery, live radar imagery, live visible/thermal imagery, etc. Every new measurement can be added to the set of existing measurements to ensure an up-to-date, accurate, dense, and rich representation of the real world.

In an embodiment, the user, or a set of users, can visualize the simulated world through a variety of different methods, with each method better suiting that user's role (e.g., a driver wears a tracking augmented reality headset, a navigator has a tablet computer, and off-site support can freely fly through the world on a desktop workstation). Continuous updating of the representation using live data may ensure that the scene is accurate to recent changes and allows a representation to be built from scratch if there is no prior data to work from. Vehicle and operator position in the real world can be determined by a variety of methods, which may include, but are not limited to, GPS, Real Time Kinematics (RTK) GPS, two-way ranging, Simultaneous Localization and Mapping (SLAM), and IMU. It is important to note that accurate determination of location in the real world is not necessary and all that is required is relative location with respect to previous measurements and with respect to the simulated world.

In an embodiment, the disclosed system may display a simulated environment to a vehicular operator to enable awareness of the surrounding environment even if weather conditions severely limit visibility. The simulated environment may be built from a variety of sources, including, but not limited to, live sensor data from vehicle-mounted sensors and from sensors mounted on other nearby vehicles, previously collected terrain data (SAR, LiDAR, imagery), GPS breadcrumbs from this or other traverses, identified environmental hazards or other geofenced regions, etc. In an embodiment, the disclosed system may synchronize the simulated environment with the operator's position and pose, so that as they move in the real world, they are able to view reconstructed sensor data that corresponds to their current location in the simulated world.

FIG. 1 is a functional block diagram illustrating one example of a system, generally designated 100, for real-time sensor visualization in degraded visual environments consistent with the present disclosure. The system 100 includes vehicle 110 optionally connected to network 120 and may also include information repository 130 and remote user 140. Vehicle 110 includes computing device 112, LiDAR 114, vehicle sensors 116, and optionally may include display 118.

Computing device 112 can be a standalone computing device, a management server, a web server, a mobile computing device, or any other electronic device or computing system capable of receiving, sending, and processing data. In an embodiment, computing device 112 can be a personal computer, a laptop computer, a tablet computer, a netbook computer, a smart phone, or any programmable electronic device capable of communicating with other computing devices (not shown) within distributed data processing environment 100 via network 120. In another embodiment, computing device 112 can represent a server computing system utilizing multiple computers as a server system, such as in a cloud computing environment.

LiDAR 114 determines ranges by targeting an object or a surface with a laser and measuring the time for the reflected light to return to the receiver. A typical LiDAR sensor emits pulsed light waves into the surrounding environment, which bounce off surrounding objects and return to the sensor. The sensor uses the time it took for each pulse to return to the sensor to calculate the distance it traveled. Repeating this process many times creates a precise, real-time 3D map of the environment called a point cloud.

Vehicle 110 may include vehicle sensors 116. The vehicle sensors 116 are additional sensors to assist the vehicle 110 to create the visualization of the environment. The vehicle sensors 116 may include, but are not limited to, radar circuitry, including millimeter wave radar, cameras, GPS or IMU circuitry, and SAR circuitry. Any additional sensors that may aid in the generation of the visualization may be included, as would be known to a person of skill in the art.

Vehicle 110 may include optional display 118. In some embodiments, vehicle 110 is a manned vehicle that may be operating in limited visibility, and the system may generate a software rendered presentation of their surroundings for a user, e.g., an operator or a navigator, which may be displayed on the optional display 118. In some other embodiments, vehicle 110 may be an unmanned, remotely operated vehicle, e.g., an unmanned ground vehicle (UGV), and therefore may not contain optional display 118.

Display 118 may be any appropriate display for viewing the software rendered presentation of the surroundings including, but not limited to, a dash mounted screen, a portable display (such as a tablet computer or phone), an immersive headset (such as a virtual reality headset) or see through headsets (such as an augmented reality headset).

In some embodiments, system 100 may include a remote user 140. In an embodiment where vehicle 110 is a manned vehicle, remote user 140 may, for example, monitor the position of the vehicle 110. In an embodiment where vehicle 110 is an unmanned, remotely operated vehicle, remote user 140 may be the operator of the vehicle. The remote user 140 may contain a computing device 142 and a display 148.

Like the computing device 112 in vehicle 110, computing device 142 can be a standalone computing device, a management server, a web server, a mobile computing device, or any other electronic device or computing system capable of receiving, sending, and processing data. In an embodiment, computing device 142 can be a personal computer a laptop computer, a tablet computer, a netbook computer, a smart phone, or any programmable electronic device capable of communicating with other computing devices (not shown) within distributed data processing environment 100 via network 120. In another embodiment, computing device 142 can represent a server computing system utilizing multiple computers as a server system, such as in a cloud computing environment. In yet another embodiment, computing device 142 represents a computing system utilizing clustered computers and components (e.g., database server computers, application server computers) that act as a single pool of seamless resources when accessed within distributed data processing environment 100.

Display 148 may be any appropriate display for viewing the software rendered presentation of their surroundings including, but not limited to, a dash mounted screen, a portable display (such as a tablet computer or phone), an immersive headset (such as a virtual reality headset) or see through headsets (such as an augmented reality headset).

In an embodiment, system 100 may include information repository 130. In an embodiment, information repository 130 may be managed by computing device 112 or computing device 142. In some embodiments, information repository 130 is stored on computing device 112 or computing device 142. Information repository 130 is a data repository that can store, gather, compare, and/or combine information. Information repository 130 may be implemented using any volatile or non-volatile storage media for storing information, as known in the art. For example, information repository 130 may be implemented with random-access memory (RAM), solid-state drives (SSD), one or more independent hard disk drives, multiple hard disk drives in a redundant array of independent disks (RAID), optical library, or a tape library. Similarly, information repository 130 may be implemented with any suitable storage architecture known in the art, such as a relational database, an object-oriented database, or one or more tables.

Figure 2:
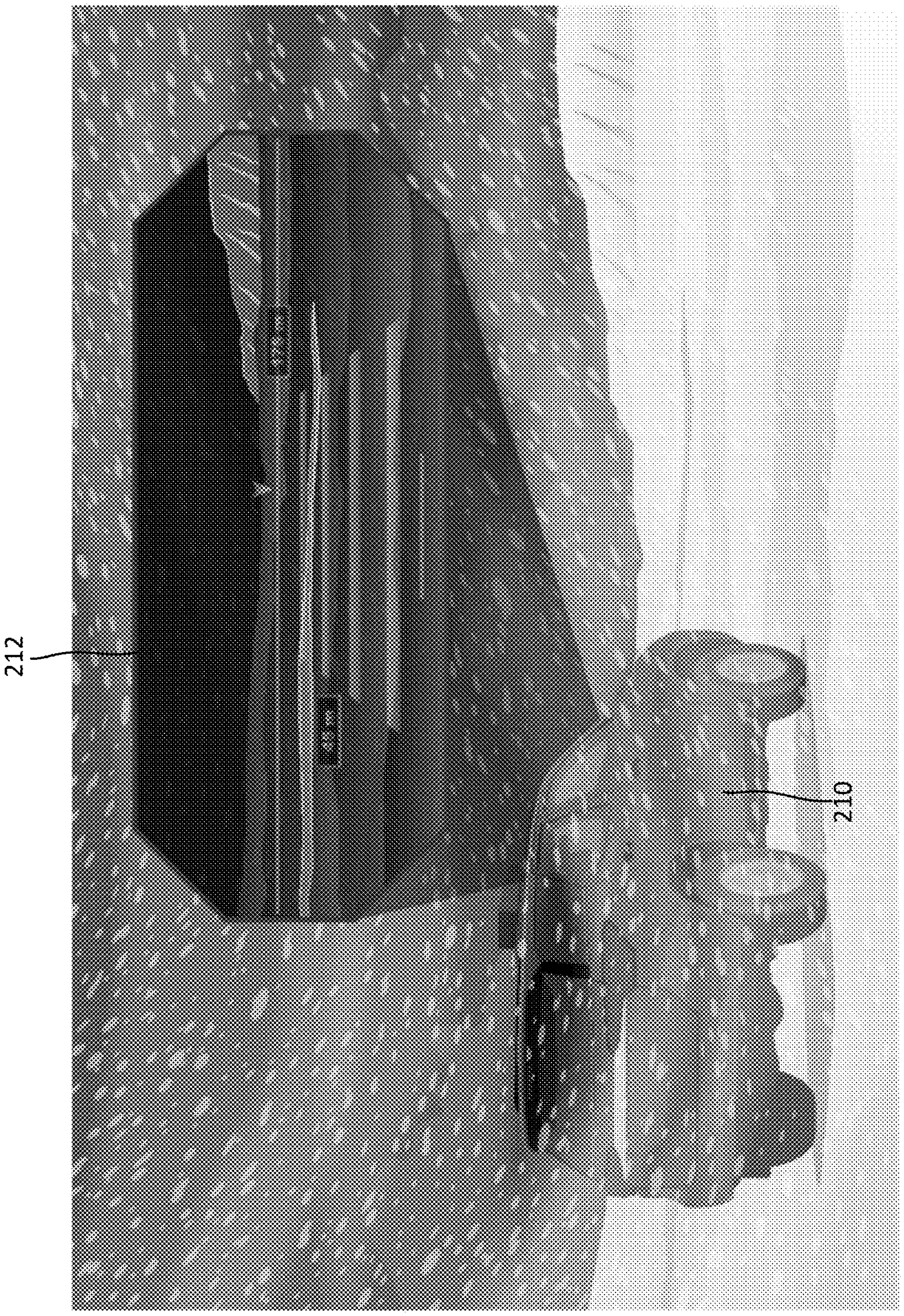
FIG. 2 is an example of a real-time sensor visualization consistent with the present disclosure.

FIG. 2 is an example of a real-time sensor visualization consistent with the present disclosure. In the example of FIG. 2, vehicle 210 is traveling in inclement weather, and possibly navigating unmapped terrain. For example, vehicle 210 may be a military vehicle in an operation, a search and rescue vehicle attempting to locate a lost or injured victim, or a mining vehicle operating in a mining operation in inclement weather or heavy dust conditions.

Simulated display 212 is an intuitive visualization generated by the system of FIG. 1 to guide the operator of the vehicle 210, whether an occupant of a manned vehicle, or a remote operator of an unmanned vehicle. In embodiments where the vehicle 210 is manned and operated locally, the simulated display 212 may be, for example, optional display 118 in vehicle 110 of FIG. 1. In embodiments where the vehicle 210 is an unmanned, remotely operated vehicle, simulated display 212 may be, for example, display 148 of the remote user 140 of FIG. 1.

Figure 3:
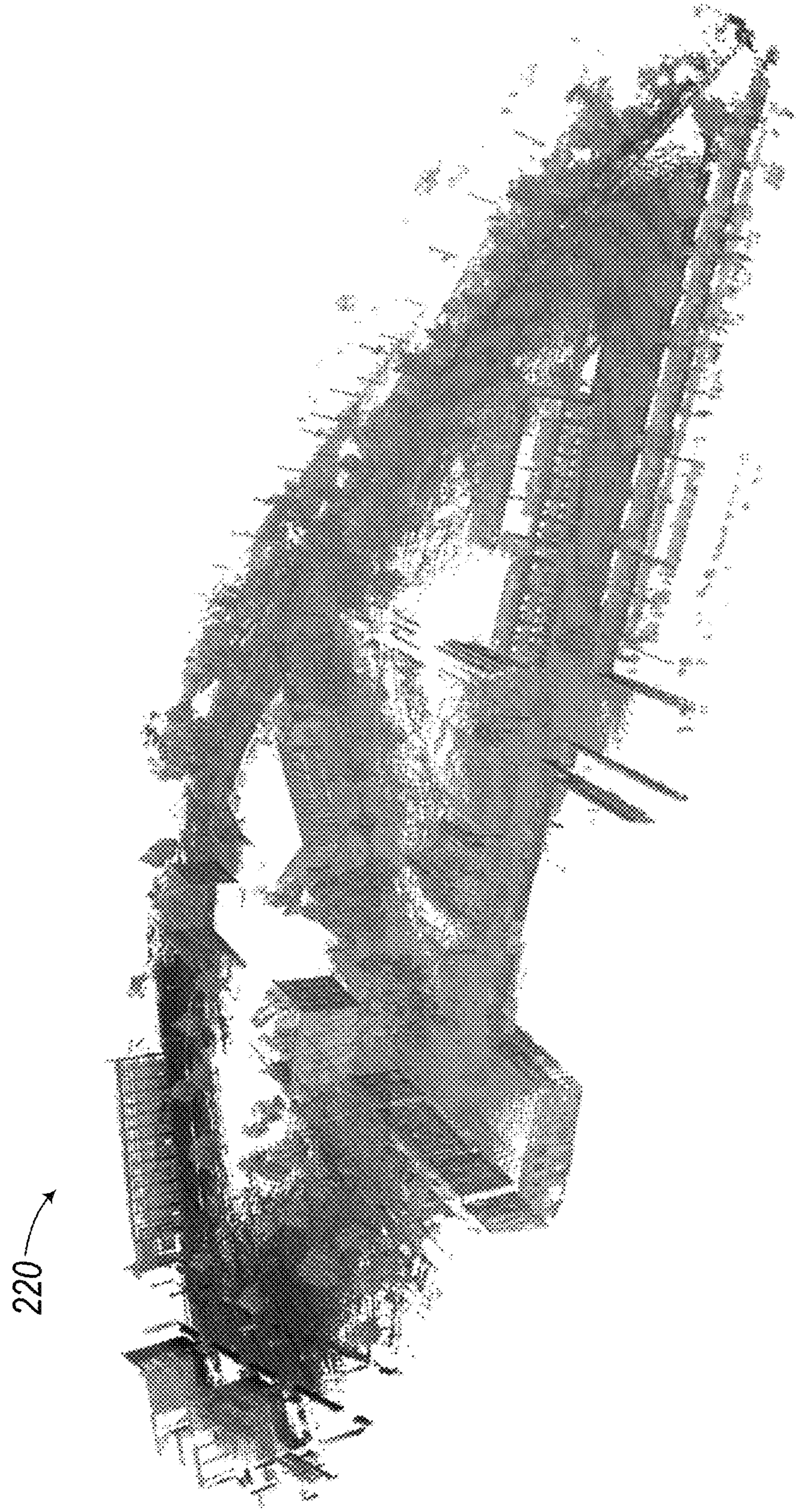
FIG. 3 is an example of a generated terrain map consistent with the present disclosure.

FIG. 3 is an example of a generated terrain map 220 consistent with the present disclosure. The example visualization shown in FIG. 3 is a 3D image constructed by the disclosed system using the LiDAR and sensors of, for example, vehicle 110 of FIG. 1.

Figure 4:
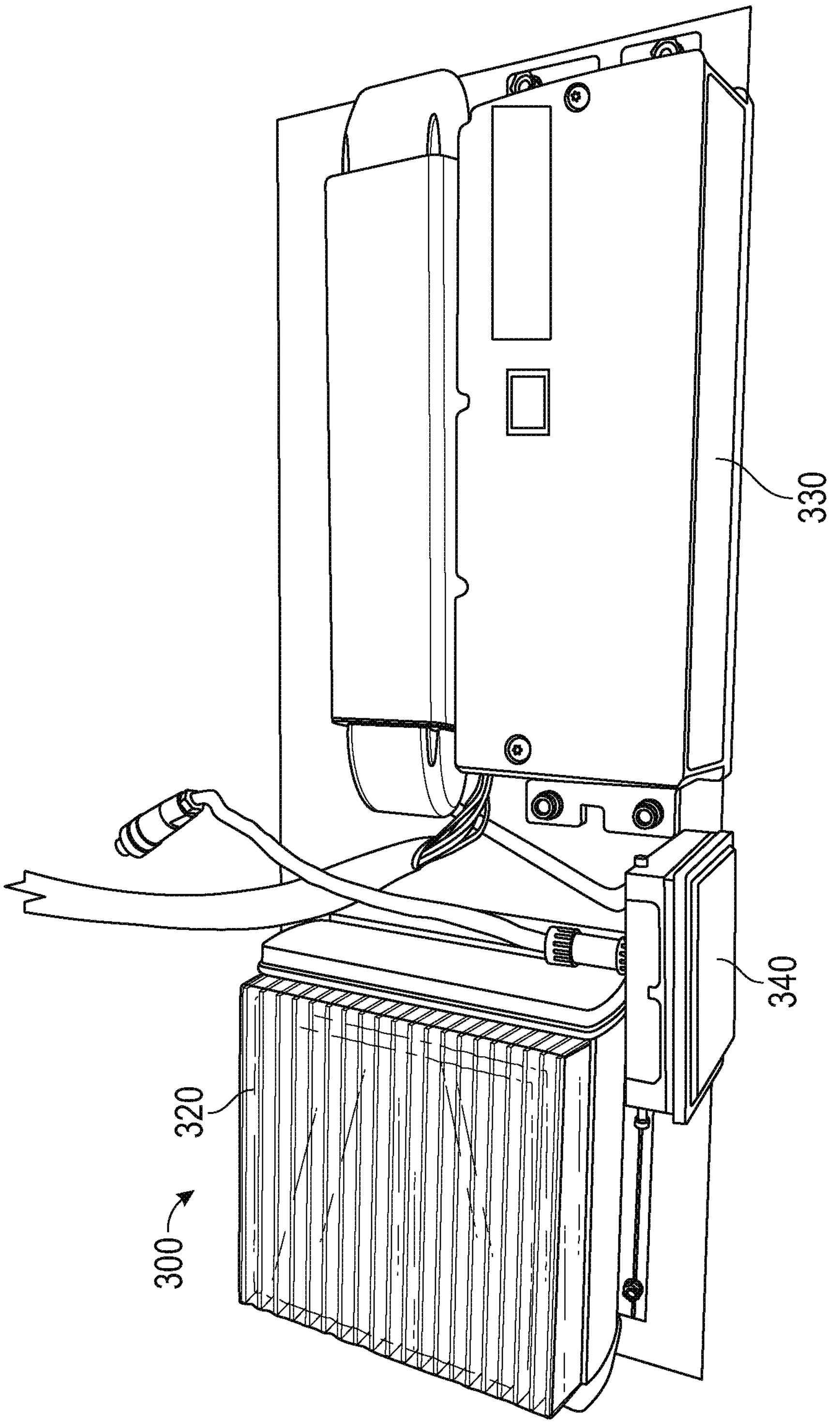
FIG. 4 is an example implementation of a system for real-time sensor visualization in degraded visual environments of FIG. 1, consistent with the present disclosure.

FIG. 4 is an example implementation of a system 300 for real-time sensor visualization in degraded visual environments of FIG. 1, consistent with the present disclosure. The system 300 illustrated in FIG. 4 includes electronics circuitry 320, which may include, but is not limited to, a computing device, e.g., computing device 112 from FIG. 1, other processors, such as graphics processing units, and sensors, e.g., vehicle sensors 116 from FIG. 1. The sensors may include, but are not limited to, radar, cameras, GPS or IMU receivers, and SAR. The system 300 also includes LiDAR circuitry 330 and radar circuitry 340.

Figure 5:
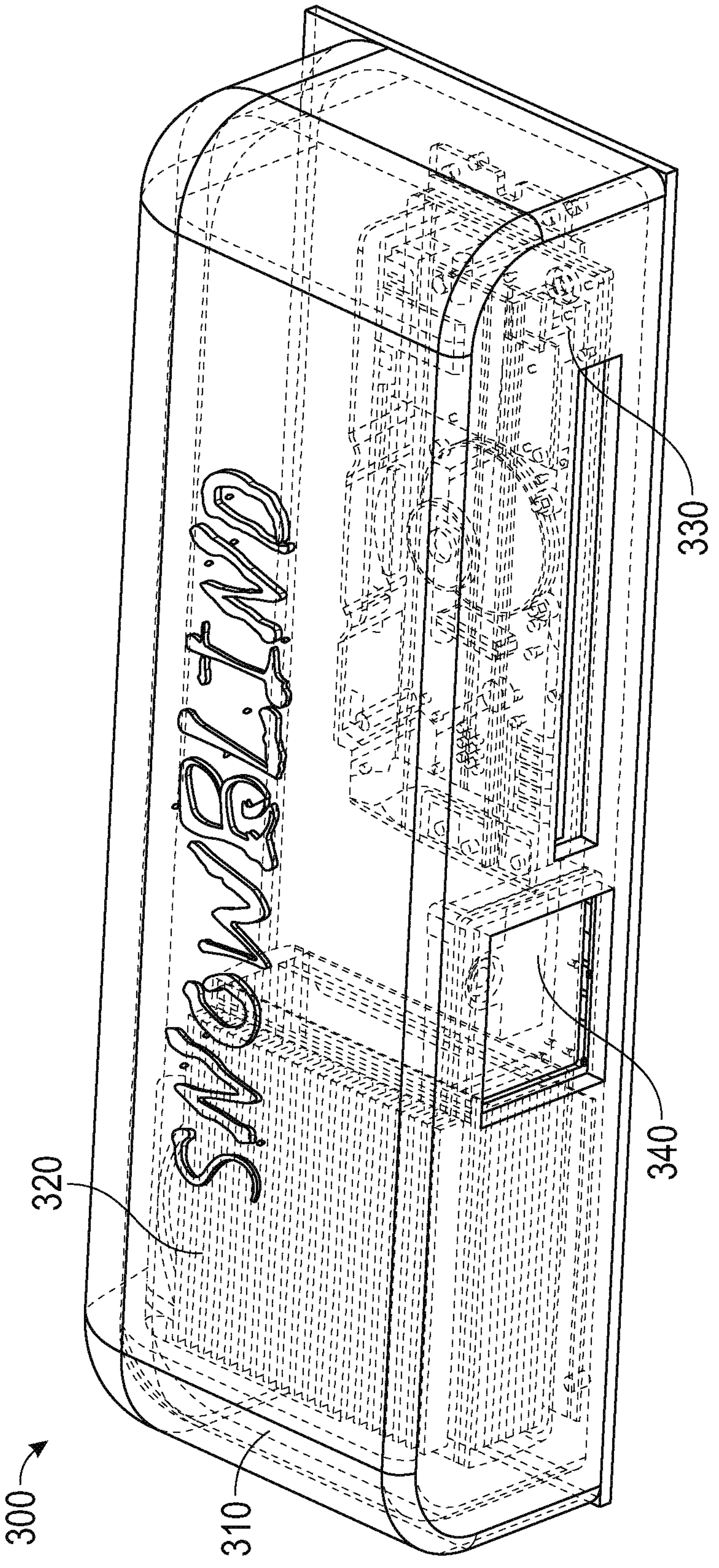
FIG. 5 is another example of the system of FIG. 4, consistent with the present disclosure.

FIG. 5 is another example of the system 300 of FIG. 4, consistent with the present disclosure. In addition to the electronics circuitry 320, the LiDAR circuitry 330, and the radar circuitry 340, the example of FIG. 5 includes enclosure 310. In an embodiment, enclosure 310 may be sealed from the external environment to protect the electronic components of system 300.

Figure 6:
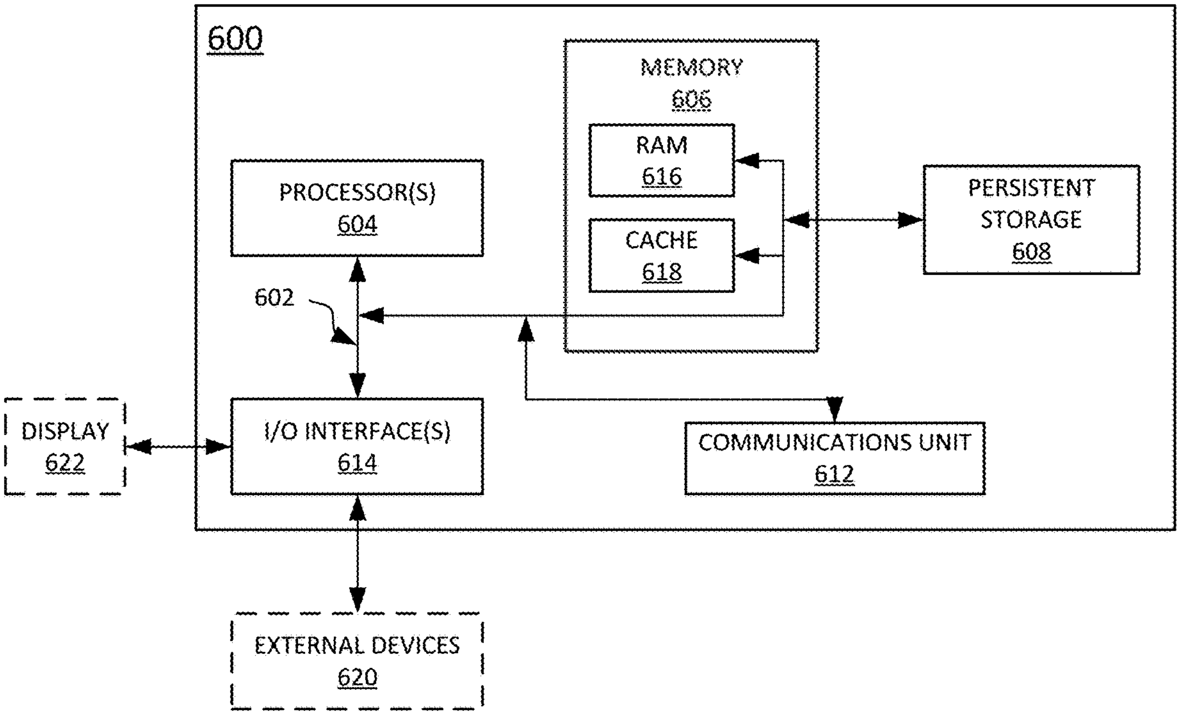
FIG. 6 depicts a block diagram of components of the computing device within the system of FIG. 1, in accordance with an embodiment of the present disclosure.
Figure 7A:
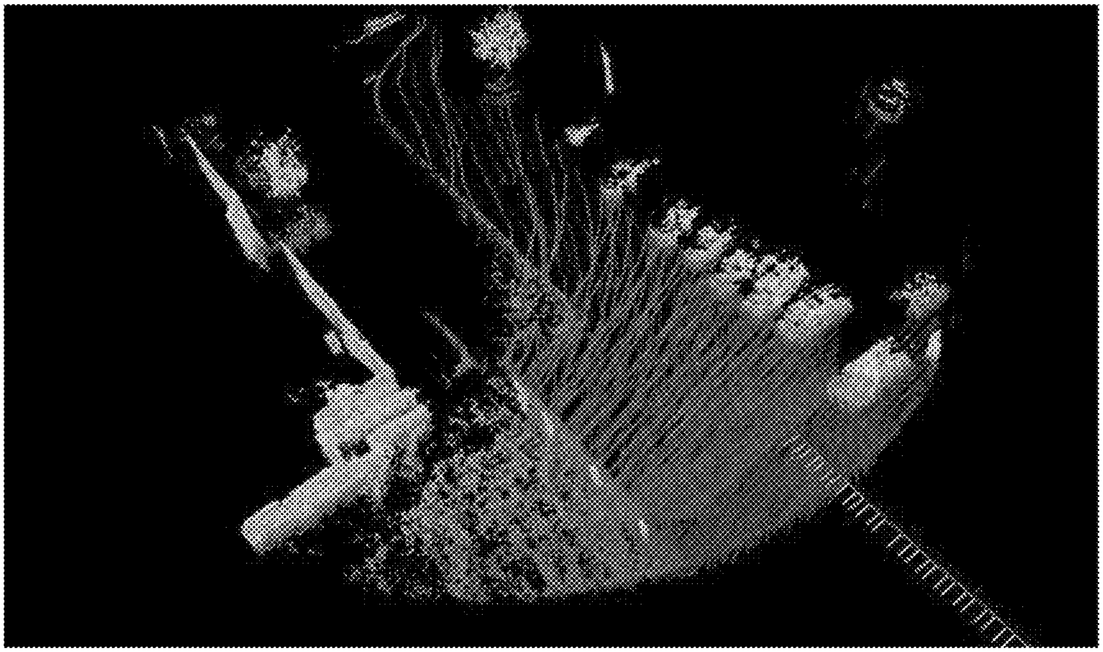
FIGS. 7A-7D are an example of building a 3D occupancy map from a moving vehicle consistent with the present disclosure.
Figure 7B:
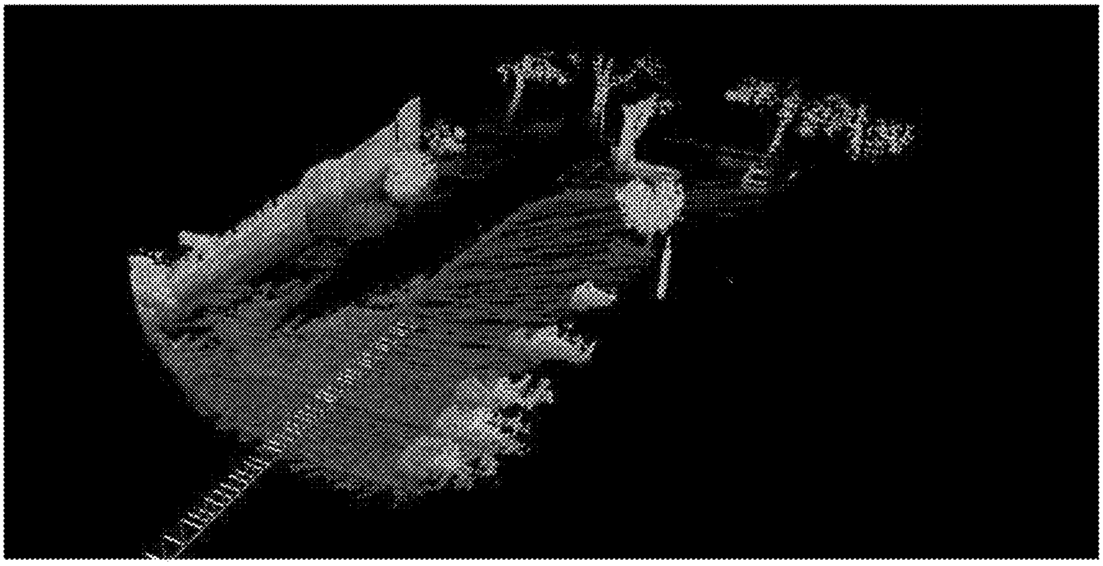
Figure 7C:
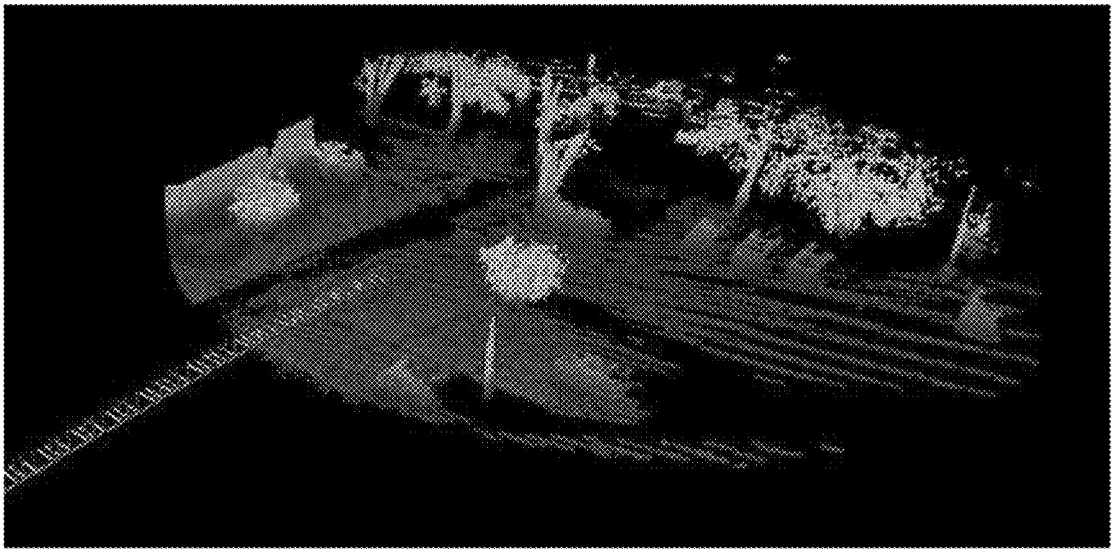
Figure 7D:
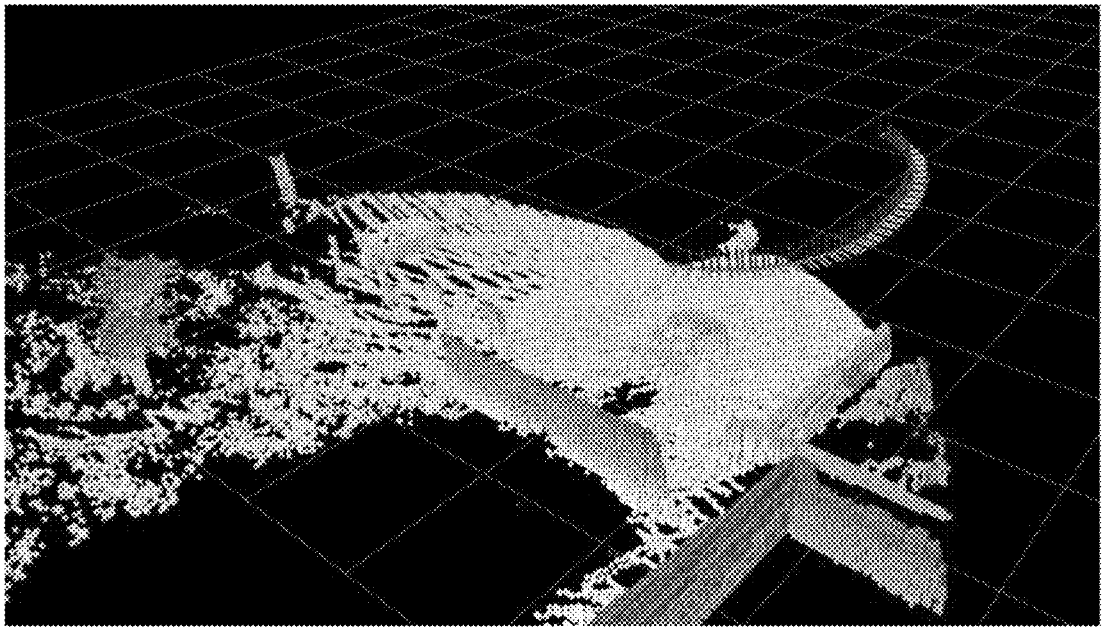

FIG. 6 is a block diagram depicting components of one example of the computing device 112 or computing device 142 suitable for real-time sensor visualization in degraded visual environments, within the system of FIG. 1, consistent with the present disclosure. FIG. 6 displays the computing device or computer 600, one or more processor(s) 604 (including one or more computer processors), a communications fabric 602, a memory 606 including, a random-access memory (RAM) 616 and a cache 618, a persistent storage 608, a communications unit 612, I/O interfaces 614, a display 622, and external devices 620. It should be appreciated that FIG. 6 provides only an illustration of one embodiment and does not imply any limitations with regard to the environments in which different embodiments may be implemented. Many modifications to the depicted environment may be made.

As depicted, the computer 600 operates over the communications fabric 602, which provides communications between the computer processor(s) 604, memory 606, persistent storage 608, communications unit 612, and input/output (I/O) interface(s) 614. The communications fabric 602 may be implemented with an architecture suitable for passing data or control information between the processors 604 (e.g., microprocessors, communications processors, and network processors), the memory 606, the external devices 620, and any other hardware components within a system. For example, the communications fabric 602 may be implemented with one or more buses.

The memory 606 and persistent storage 608 are computer readable storage media. In the depicted embodiment, the memory 606 comprises a RAM 616 and a cache 618. In general, the memory 606 can include any suitable volatile or non-volatile computer readable storage media. Cache 618 is a fast memory that enhances the performance of processor(s) 604 by holding recently accessed data, and near recently accessed data, from RAM 616.

Program instructions for real-time sensor visualization in degraded visual environments may be stored in the persistent storage 608, or more generally, any non-volatile computer readable storage media, for execution by one or more of the respective computer processors 604 via one or more memories of the memory 606. The persistent storage 608 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

The communications unit 612, in these examples, provides for communications with other data processing systems or devices. In these examples, the communications unit 612 includes one or more network interface circuits. The communications unit 612 may provide communications through the use of either or both physical and wireless communications links. In the context of some embodiments of the present disclosure, the source of the various input data may be physically remote to the computer 600 such that the input data may be received, and the output similarly transmitted via the communications unit 612.

The I/O interface(s) 614 allows for input and output of data with other devices that may be connected to computer 600. For example, the I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present disclosure, e.g., for real-time sensor visualization in degraded visual environments, can be stored on such portable computer readable storage media and can be loaded onto persistent storage 608 via the I/O interface(s) 614. I/O interface(s) 614 also connect to a display 622.

Display 622 provides a mechanism to display data to a user and may be, for example, a computer monitor. Display 622 can also function as a touchscreen, such as a display of a tablet computer.

In an embodiment, the system may include building a 3D occupancy map from a moving vehicle. FIGS. 7A-7D are an example of building a 3D occupancy map from a moving vehicle consistent with the present disclosure. Disclosed herein is a system and method for a probabilistic 3D occupancy map in a world frame generated in real-time around a LiDAR sensor's local radius using sensor-derived point clouds and transform data as inputs.

An occupancy map is a type of binary tree that can compactly store 3D occupancy information, that is, the probability of a voxel (a 3D section of the world) being occupied, free, or unknown. As a LiDAR-IMU sensor-package traverses the world space it collects point cloud data and pose data (i.e., XYZ, roll-pitch-yaw) across space and time and inserts the data into the occupancy map as an occupied cell. Because a lidar point will not be measured if a blockage occurs in the path between sensor to the point, a ray cast operation can be performed through the existing map to declare free space. The disclosed method performs 3D scene reconstruction in real-time, outdoor, vehicle radius with less than 15 cm resolution. The benefits of an occupancy map in real time are a spatial reconstruction of occupancy that can provide human readable visual depth information in 3D space that can be rendered from any angle, color mapping, shaders, etc., but also can inform autonomous navigation, object classification, as well as be compactly accumulated and stored for later and/or shared to other systems as a stream.

Existing occupancy maps are designed for post-processed, indoor, wholistic, flat mapping of environments with large drawbacks in performance in the disclosed application of 3D reconstruction in a real-time, outdoor, vehicle radius. Ray casting is an expensive operation not ideal for use in real-time in large quantities. As the occupancy map accumulates to a large outdoor world, insertion speeds markedly lengthen. Because the existing occupancy map implementation could assume flat ground, it largely could segment out most of the ground points. However, this is not appropriate to the disclosed system because the terrain is the major focus. To address this large disparity, the disclosed system implements a multi-faceted approach: first, a voxel grid filter is applied to the point cloud and a low-pass filter is applied to down sample the density and range of points actively inserted into the occupancy map. Second, a "self-trim" step is added to the occupancy map with a configurable radius, for example, a 30 meter radius, around an adjustable center point projected a predetermined bias ahead of the vehicle. In an embodiment, the predetermined bias ahead of the vehicle may be 30 meters. This ensures that, unlike existing systems, the disclosed occupancy mapping system can run indefinitely without memory overflow or crashes. Third, the ray casting distance and concentration are reduced with the introduction of an adjustable subradius ray casting. Because a disproportional number of cells are free cells, the disclosed system does not insert all free cells but only free cells located within a configurable distance, for example, two meters, of occupied cells (i.e., most lidar noise comes just around the edges, and therefore only the edges are sharpened). Fourth, for additional speed boosts, an option for simply not applying free space ray cast corrections is provided and, in some scenarios, this is more useful to users. Fifth, a half-life is applied to occupied voxels where if the occupied voxels are not updated by a new scan within a configurable period of time, for example, three seconds, the voxel becomes "free." In this way, false occupied cells do not persist while true occupied cells persist.

In the example of FIGS. 7A-7D, the system is generating a 3D occupancy map as a vehicle is driven down a parking lot of parked cars. The perimeter of a building is mapped, as well as tree leaves, and poles. Because the occupancy map is generated in a coherent world space, it is stitched together from multiple point clouds in space and time and enables the user to view the voxels from multiple angles.

Figure 8A:
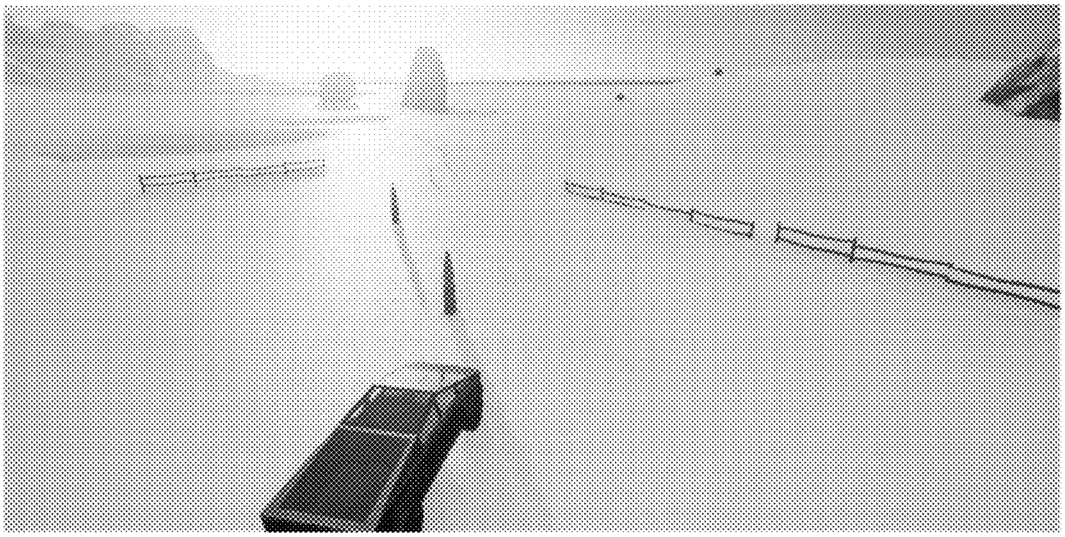
FIG. 8A is an example of simulated scene.
Figure 8B:
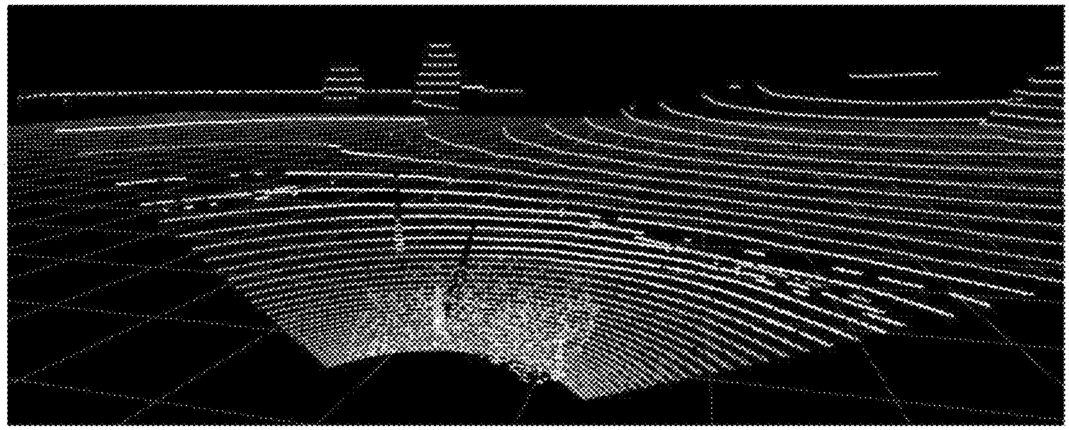
FIG. 8B is an image of the simulated scene recorded from a LiDAR sensor which includes returns where particles were hit.
Figure 8C:
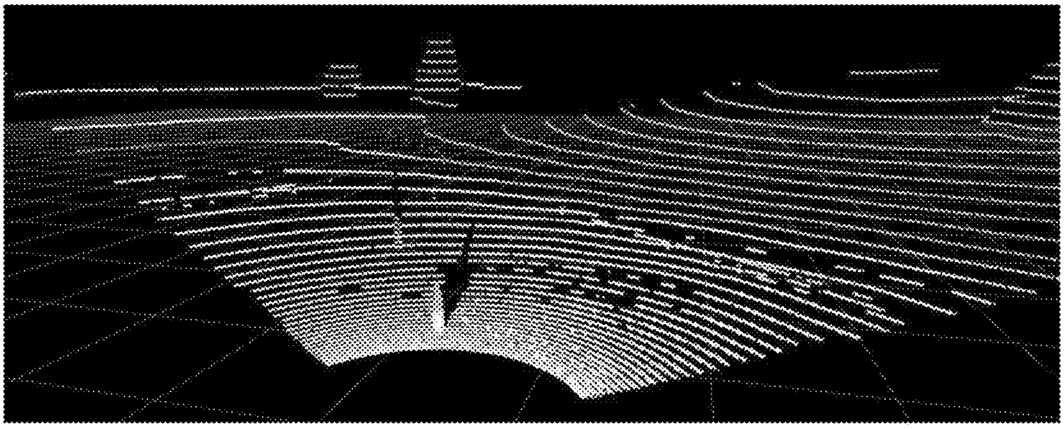
FIG. 8C is the image of the simulated scene from FIG. 8B with the returns associated with snow particles removed, consistent with the present disclosure.

In an embodiment, the system may include a real-time statistical outlier removal of noise points (such as snow) in LiDAR point clouds. FIG. 8A is an example of simulated scene, FIG. 8B is an image of the simulated scene recorded from a LiDAR sensor which includes returns where particles were hit, and FIG. 8C is the image of the simulated scene from FIG. 8B with the returns associated with snow particles removed, consistent with the present disclosure.

In snow conditions, raw point clouds (~300 k points for the example of FIGS. 8A-8C) recorded from a LiDAR sensor may include returns where particles were hit. The goal is to remove the returns associated with snow particles while retaining the rest of the returns associated with the scene. To do this, the disclosed system uses an algorithm to organize all the points into a K-Dimensional (Kd) tree, i.e., a binary search tree where data in each node is a K-Dimensional point in space. First, only points within a relevant radius to the sensor and mean distances of the k nearest neighbors of every point within that radius are considered to develop a global threshold dependent on the mean, standard deviation, and tunable multipliers. Then points are discriminated based upon this global threshold and an intensity threshold i, in this case, intensity is equated to reflectance values from the sensor.

Existing approaches are implemented in research papers in a proof-of-concept, post-processing use-case. To make the system compatible in most robotics systems, in an embodiment the system may be implemented as a Robotic Operating System (ROS1) node. To make the system real time and resource conservative, numerous optimizations are implemented. In an embodiment, graphics processing unit (GPU) acceleration may be used for the distance, mean, and standard deviation calculations for every point to boost the speed and offload the bulk of calculations onto the GPU, freeing the CPU for other work on the system.

Dense point clouds with many overlapping points are not efficiently iterated across by the Kd tree FLANN algorithm. To solve this, the disclosed system may apply a voxel grid filter to essentially down sample overlapping points. One other issue is that noise particles roughly the size of scene elements that are located relatively alone in a scene are difficult to distinguish mathematically from noise in the existing approach, especially when scan pattern coverage is not favorable for the element (i.e., if snow particles are the size of a raised hand because they are closer to the sensor or oddly large, the returns composing the hand may also be removed unless it has enough nearby points in the wrist, arm, etc., to indicate it should be kept). To mitigate this, careful consideration of filter parameters is crucial, as well as choice of sensor scan pattern to provide appropriate point density to areas of interest. Clearly these are tradeoffs, and in the disclosed system it was deemed prudent to make the system less scrutinous in order to preserve some small details, at the expense of some negligible, transient noise. The fixed scan pattern may not help when scene elements of interest receive unfavorable scan pattern coverage, but it is understood that via vehicle motion over time, scene elements will receive coverage, nonetheless. Another issue is what measurements attributes provided by the sensor can limit or improve its effectiveness. In some embodiments, the LiDAR point cloud may not provide "Intensity." In these embodiments, the disclosed system instead used "Reflectance" as a replacement threshold for the algorithm. Only points below a tuned reflectance threshold could be discarded, which helps mitigate false positives for discarding noise. In an embodiment, all filtering parameters may be manually and visually tuned via trial and error using sensor-specific data. For example, in one test a snow machine obstructed various scene elements with fake snow and the filter removed roughly 95%+ of snow noise. More measured point data attributes, in addition to position and reflectance, can only enhance filtering.

The example of FIG. 8A illustrates a real-time simulator scene in which random collision snow particles are simulated in a radius around a sensor. FIG. 8B is a LiDAR image of the simulated scene of FIG. 8A, and FIG. 8C is the LiDAR image of the simulated scene of FIG. 8A with the returns associated with snow particles removed by the disclosed system.

Figure 9A:
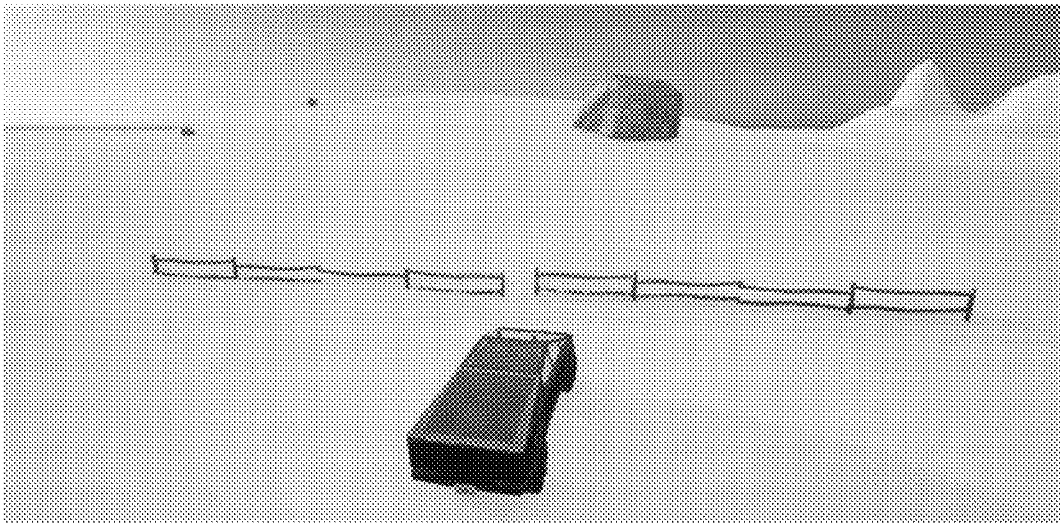
FIGS. 9A-9C are another example of removing the returns associated with snow particles, consistent with the present disclosure.
Figure 9B:
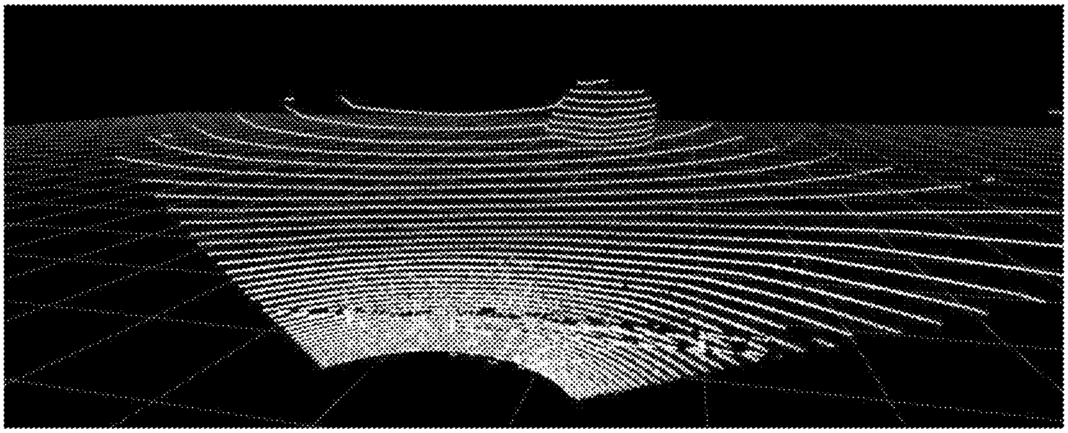
Figure 9C:
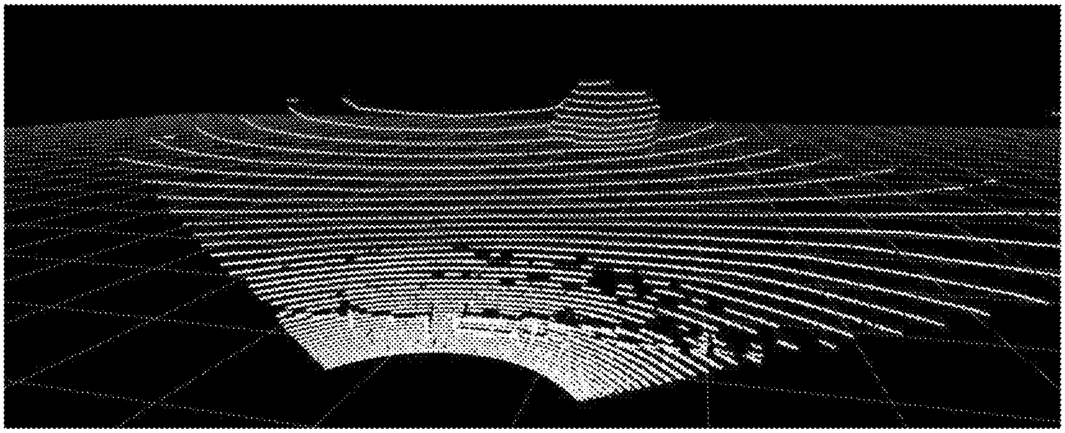

FIGS. 9A-9C are another example of removing the returns associated with snow particles, consistent with the present disclosure. As in the example of FIGS. 8A-8C, the example of FIG. 9A illustrates a real-time simulator scene in which random collision snow particles are simulated in a radius around a sensor. FIG. 9B is a LIDAR image of the simulated scene of FIG. 9A, and FIG. 9C is the LiDAR image of the simulated scene of FIG. 9A with the returns associated with snow particles removed by the disclosed system.

Figure 10A:
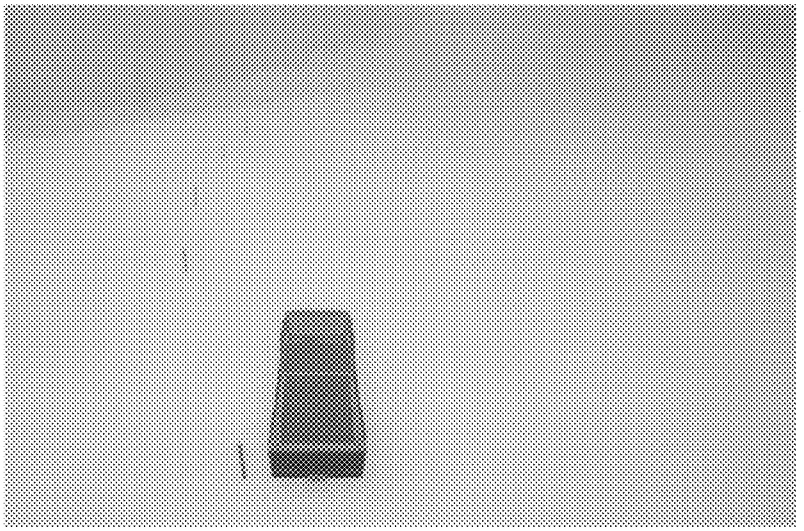
FIGS. 10A-10C are another example of removing the returns associated with snow particles, consistent with the present disclosure.
Figure 10B:
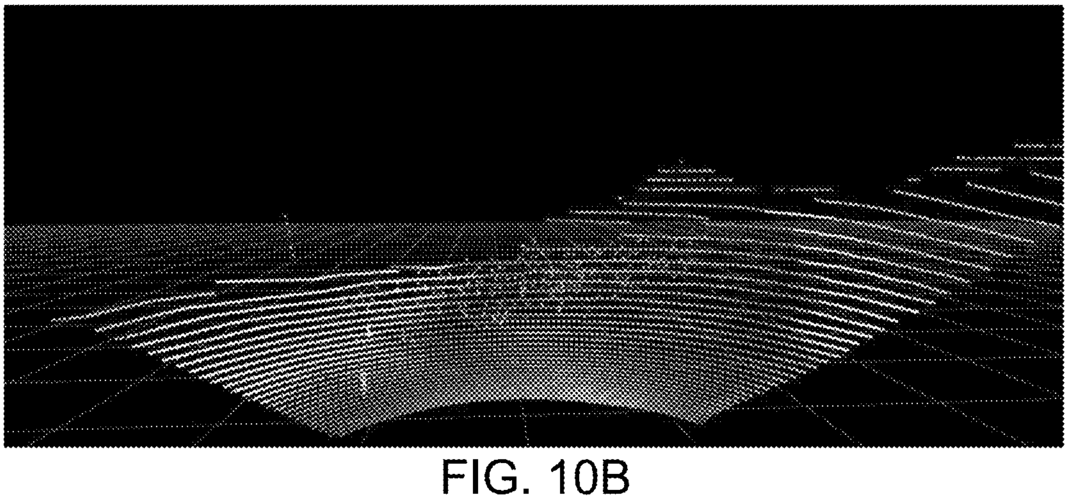
Figure 10C:
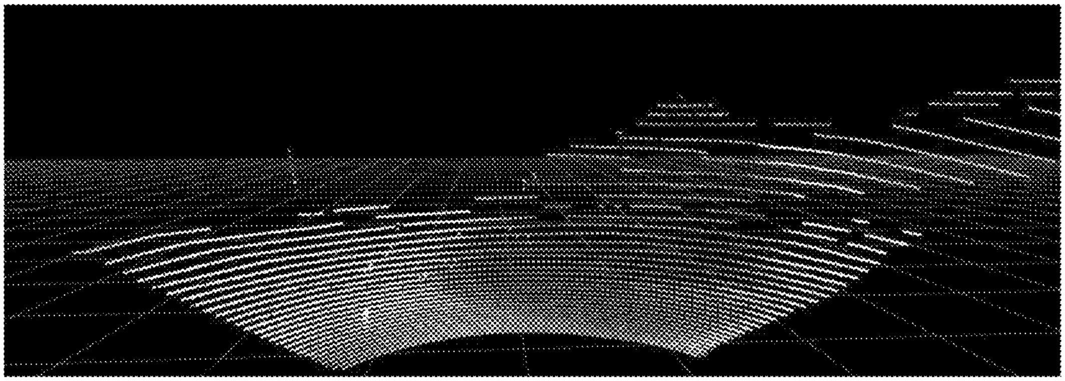

FIGS. 10A-10C are another example of removing the returns associated with snow particles, consistent with the present disclosure.

As in the example of FIGS. 8A-8C, the example of FIG. 10A illustrates a real-time simulator scene in which random collision snow particles are simulated in a radius around a sensor. FIG. 10B is a LiDAR image of the simulated scene of FIG. 10A, and FIG. 10C is the LiDAR image of the simulated scene of FIG. 10A with the returns associated with snow particles removed by the disclosed system.

Figure 11:
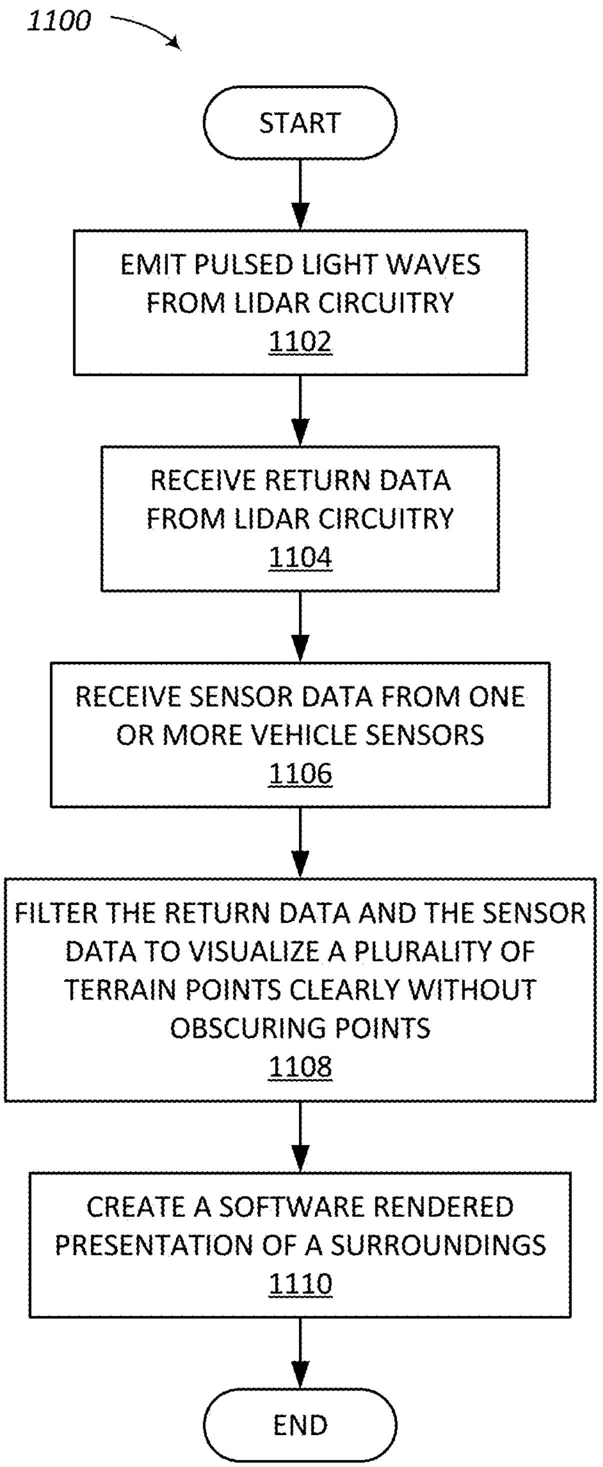
FIG. 11 is a flowchart diagram depicting the process for one example embodiment for real-time sensor visualization in degraded visual environments, consistent with the present disclosure.

FIG. 11 is a flowchart diagram depicting the process 1100 for one example embodiment for real-time sensor visualization in degraded visual environments, consistent with the present disclosure. It should be appreciated that FIG. 11 provides only an illustration of one implementation and does not imply any limitations with regard to the environments in which different embodiments may be implemented. Many modifications to the depicted environment may be made by those skilled in the art without departing from the scope of the disclosure as recited by the claims.

Process includes emitting pulsed light waves from a LiDAR circuitry (operation 1102). In the illustrated example embodiment, the process causes pulsed light waves to be emitted into the surrounding environment from a LiDAR sensor.

Process includes receiving return data from the LiDAR circuitry (operation 1104). The pulsed light waves emitted into the surrounding environment from the LiDAR sensor in operation 1102 bounce off surrounding objects and return to the sensor. The sensor uses the time it took for each pulse to return to the sensor to calculate the distance it traveled. In operation 1104, the process receives this return data from the LiDAR sensor. In an embodiment, repeating this process many times creates a precise, real-time 3D map of the environment called a point cloud.

Process includes receiving sensor data from one or more vehicle sensors (operation 1106). In operation 1106, the process receives data from one or more vehicle sensors installed in a target vehicle to assist in creating the visualization of the environment. In an embodiment, the vehicle sensors may include, but are not limited to, radar circuitry, including millimeter wave radar, cameras, GPS or IMU circuitry, and SAR circuitry.

Process includes filtering the return data and the sensor data to visualize a plurality of terrain points clearly without obscuring points (operation 1108).

In an embodiment, the disclosed system may be configured to operate by mining and processing LiDAR return data in search of lucky returns. The system detects non-random return locations in the point cloud. For example, if multiple returns are received from the same point in the point cloud, then the point is likely a fixed point, i.e., part of the terrain. If multiple returns are not received from the same point in the point cloud, then the return is likely from a particle, such as snow or dust. These may be fixed if the operator is fixed, moving, or moving in a smooth manner consistent with the movement of the operator. The disclosed system looks for Doppler shifts or unexpected rotational shifts in the return signals. In an embodiment, the process may take steps to allow for more lucky returns, for example, by causing the LiDAR to tune for lower scattering and absorption in the specific particulate cloud encountered, and by causing the beam diameter to decrease (i.e., decreasing beam divergence) to allow the lucky window to be smaller.

In an embodiment, the system may filter the return data using temporal and spatial filtering of streaming return data, and may establish a terrain reference frame, either from flow of the data or from orthogonal sensors, to aid filtering of obscurant-associated data. The system applies this filtering, in near-real time, to LiDAR data, radar data, and other sensor data to visualize the terrain points without obscuring points. This concept allows the filtering of snow, dust, rain, or other obscurants from sensor-derived point cloud data. This enables clear synthetic vision for driver assistance technologies or terrain generation for autonomous vehicles.

Process includes creating a software rendered presentation of a surroundings (operation 1110). In operation 1110, the process may create a software rendered presentation of the surroundings, as built up from accumulated sensor measurements, fusion of those measurements, and filtering and processing of those measurements. This presentation may be optimized for recognition of dangers or objects/terrain of interest and may be continually updated as new sensor data arrives. In an embodiment, the process may send the software rendered presentation of the surroundings to a user, for example, for display in a target vehicle.

It should be noted that while the process 1100 is written around the concept of a vehicle-based system, embodiments of this disclosure may be applied to a human mounted system, human operation in a fixed environment with a rich set of environmentally mounted sensors, or any other environment where real-time sensor visualization may be required.

According to one aspect of the disclosure there is thus provided a system for real-time sensor visualization in a presence of scattering particles, the system including: a vehicle, the vehicle comprising: one or more computing devices, Light Detection and Ranging (LiDAR) circuitry; and one or more vehicle sensors. The system is configured to: emit pulsed light waves from the LiDAR circuitry; receive return data from the LiDAR circuitry; receive sensor data from the one or more vehicle sensors; filter the return data and the sensor data to visualize a plurality of terrain points without obscuring points; and create a software rendered presentation of a surroundings.

According to another aspect of the disclosure, there is thus provided a method of real-time sensor visualization in a presence of scattering particles, the method including: emitting pulsed light waves from LiDAR circuitry; receiving return data from the LiDAR circuitry; receiving sensor data from one or more vehicle sensors; filtering the return data and the sensor data to visualize a plurality of terrain points without obscuring points; and creating a software rendered presentation of a surroundings.

According to yet another aspect of the disclosure there is thus provided a system for real-time sensor visualization in a presence of scattering particles, the system including: one or more computing devices, Light Detection and Ranging (LiDAR) circuitry; and one or more additional sensors. The system is configured to: emit pulsed light waves from the LiDAR circuitry; receive return data from the LiDAR circuitry; receive sensor data from the one or more additional sensors; filter the return data and the sensor data to visualize a plurality of terrain points without obscuring points; and create a software rendered presentation of a surroundings.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor, and/or other programmable device. To that end, the methods described herein may be implemented on a tangible, non-transitory computer readable medium having instructions stored thereon that when executed by one or more processors perform the methods. Thus, for example, the memory 606 may store instructions (in, for example, firmware or software) to perform the operations described herein. The storage medium, e.g. the memory 606, may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A system for real-time sensor visualization in a presence of scattering particles, the system comprising:

a vehicle, the vehicle comprising:

one or more computing devices,

Light Detection and Ranging (LiDAR) circuitry; and one or more vehicle sensors;

the system configured to:

build a 3D occupancy map from the vehicle, the vehicle moving as the 3D occupancy map is built;

emit pulsed light waves from the LiDAR circuitry;

receive return data from the LiDAR circuitry;

receive sensor data from the one or more vehicle sensors;

filter the return data and the sensor data to visualize a plurality of terrain points without obscuring points;

collect point cloud data and pose data across space and time;

insert the point cloud data into the 3D occupancy map as an occupied cell;

perform a ray cast operation through the 3D occupancy map to declare free space; and create a software rendered presentation of a surroundings.

2. The system of claim 1, further configured to:

apply a voxel grid filter to a point cloud;

apply a low-pass filter to the point cloud to down sample a density and a range of points actively inserted into the 3D occupancy map;

apply a self-trim to the 3D occupancy map with a configurable radius around a center point projected a predetermined bias ahead of the vehicle; and reduce a ray casting distance and concentration based on an adjustable subradius ray casting.

3. The system of claim 2, further comprising:

a real-time statistical outlier removal of noise points in the point cloud.

4. The system of claim 3, further configured to:

organize all points of the point cloud into a K Dimensional tree by:

select one or more relevant points based on a relevant radius to the LiDAR circuitry and mean distances of a k nearest neighbors of every point within that radius;

determine a global threshold based on a mean, a standard deviation, and tunable multipliers; and remove any of the one or more relevant points based on the global threshold and a predetermined intensity threshold.

5. The system of claim 1, wherein filter the return data and the sensor data to visualize the plurality of terrain points without obscuring points further comprises:

filter a return data using temporal and spatial filtering of streaming point cloud data from the LiDAR circuitry and the one or more vehicle sensors.

6. The system of claim 5, wherein the return data is filtered to establish a terrain reference frame to aid filtering of obscurant-associated data.

7. The system of claim 1, further comprising:

send the software rendered presentation of the surroundings to a user.

8. The system of claim 7, wherein the vehicle is an unmanned, remotely operated vehicle and the user is an operator of the vehicle.

9. The system of claim 1, wherein the one or more vehicle sensors includes at least one of radar circuitry, Global Positioning System (GPS) circuitry, Real Time Kinematics (RTK) GPS, Inertial Measurement Unit (IMU) circuitry, and synthetic aperture radar (SAR).

10. A method for real-time sensor visualization in a presence of scattering particles, the method comprising:

building a 3D occupancy map from the vehicle, the vehicle moving as the 3D occupancy map is built;

emitting pulsed light waves from LiDAR circuitry;

receiving return data from the LiDAR circuitry;

receiving sensor data from one or more vehicle sensors;

filtering the return data and the sensor data to visualize a plurality of terrain points without obscuring points;

collecting point cloud data and pose data across space and time;

inserting the point cloud data into the 3D occupancy map as an occupied cell;

performing a ray cast operation through the 3D occupancy map to declare free space; and creating a software rendered presentation of a surroundings.

11. The method of claim 10, wherein filter the return data and the sensor data to visualize the plurality of terrain points without obscuring points further comprises:

filter the return data using temporal and spatial filtering of streaming point cloud data from the LiDAR circuitry and the one or more vehicle sensors.

12. The method of claim 11, wherein the return data is filtered to establish a terrain reference frame to aid filtering of obscurant-associated data.

13. The method of claim 10, further comprising:

organizing all points of a point cloud into a K Dimensional tree by:

selecting one or more relevant points based on a relevant radius to the LiDAR circuitry and mean distances of a k nearest neighbors of every point within that radius;

determining a global threshold based on a mean, a standard deviation, and tunable multipliers; and removing any of the one or more relevant points based on the global threshold and a predetermined intensity threshold.

14. The method of claim 10, further comprising:

applying a voxel grid filter to a point cloud;

applying a low-pass filter to the point cloud to down sample a density and a range of points actively inserted into the 3D occupancy map;

applying a self-trim to the 3D occupancy map with a configurable radius around a center point projected a predetermined bias ahead of a target vehicle; and reducing a ray casting distance and concentration based on an adjustable subradius ray casting.

15. A system for real-time sensor visualization in a presence of scattering particles, the system comprising:

one or more computing devices,

Light Detection and Ranging (LiDAR) circuitry; and one or more additional sensors;

the system configured to:

build a 3D occupancy map from the vehicle, the vehicle moving as the 3D occupancy map is built;

emit pulsed light waves from the LiDAR circuitry;

receive return data from the LiDAR circuitry;

receive sensor data from the one or more additional sensors;

filter the return data and the sensor data to visualize a plurality of terrain points without obscuring points;

collect point cloud data and pose data across space and time;

insert the point cloud data into the 3D occupancy map as an occupied cell;

perform a ray cast operation through the 3D occupancy map to declare free space; and create a software rendered presentation of a surroundings.

16. The system of claim 15, wherein filter the return data and the sensor data to visualize the plurality of terrain points without obscuring points further comprises:

filter a return data using temporal and spatial filtering of streaming point cloud data from the LiDAR circuitry and one or more vehicle sensors.

17. The system of claim 16, wherein the return data is filtered to establish a terrain reference frame to aid filtering of obscurant-associated data.

18. The system of claim 15, wherein the system is a human mounted system.

* * * * *